Jan. 1, 1952
A. S. GOULD
2,581,096
ROCKET LAUNCHER
Filed Aug. 13, 1945
2 SHEETS—SHEET 1
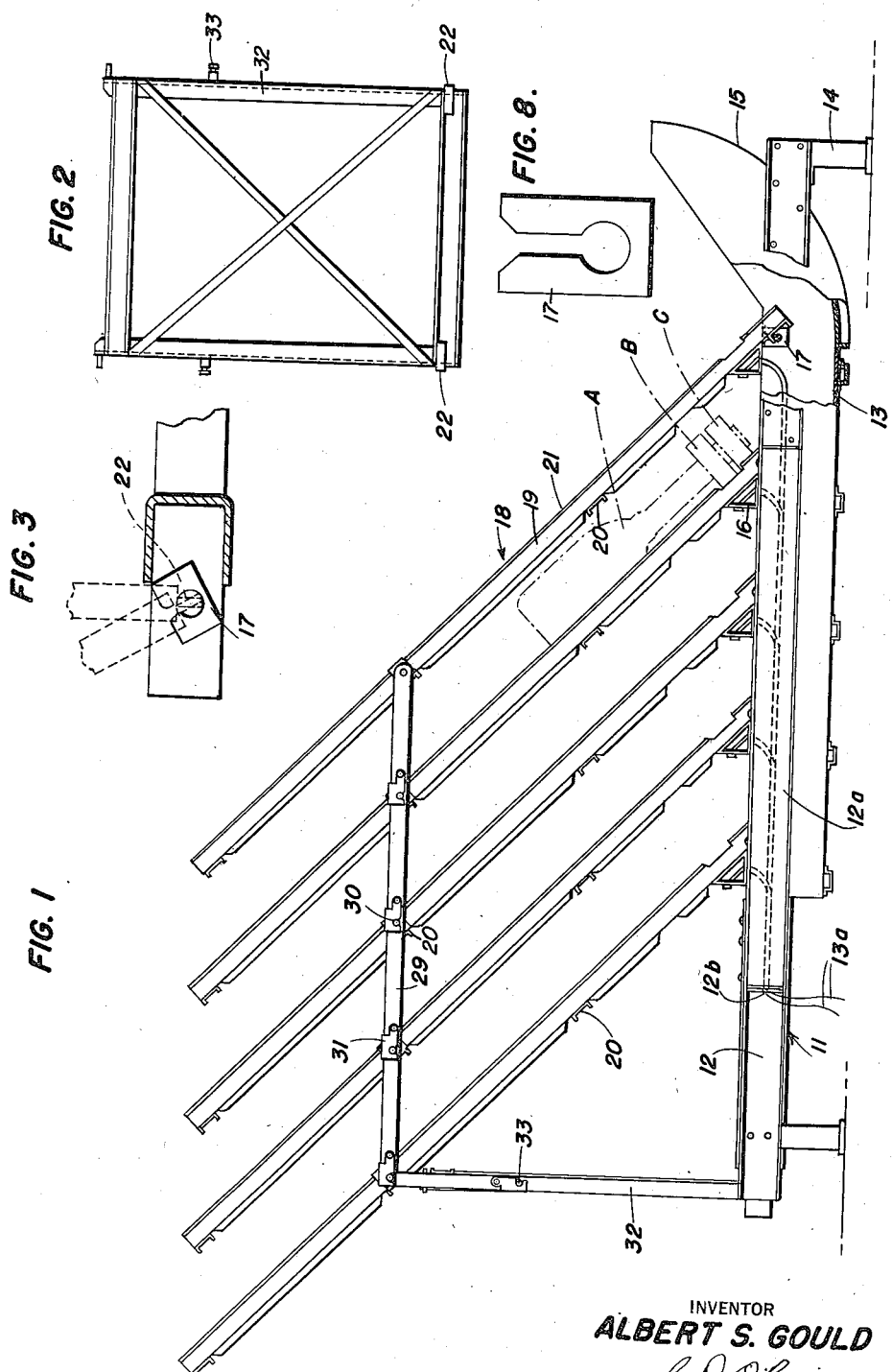
INVENTOR
ALBERT S. GOULD
BY
ATTORNEY Jan. 1, 1952 A. S. GOULD 2,581,096
ROCKET LAUNCHER
Filed Aug. 13, 1945 2 SHEETS—SHEET 2
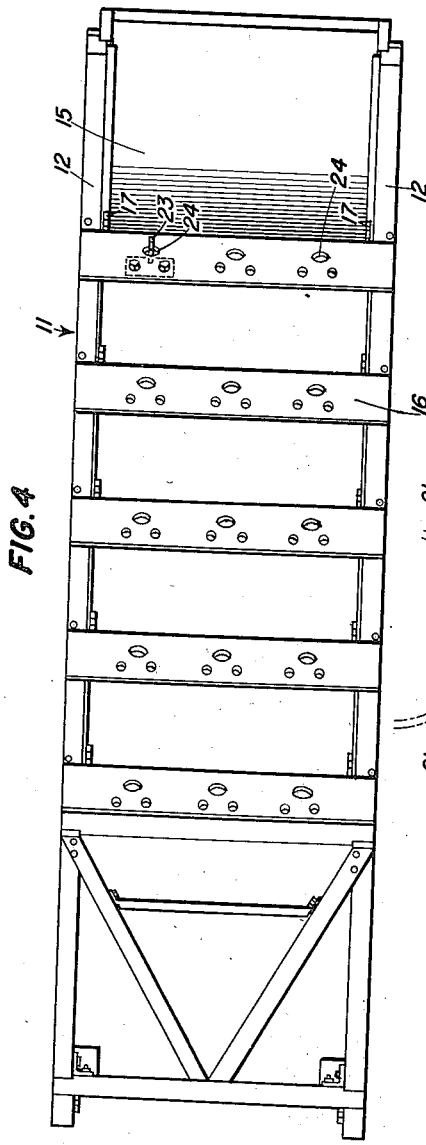
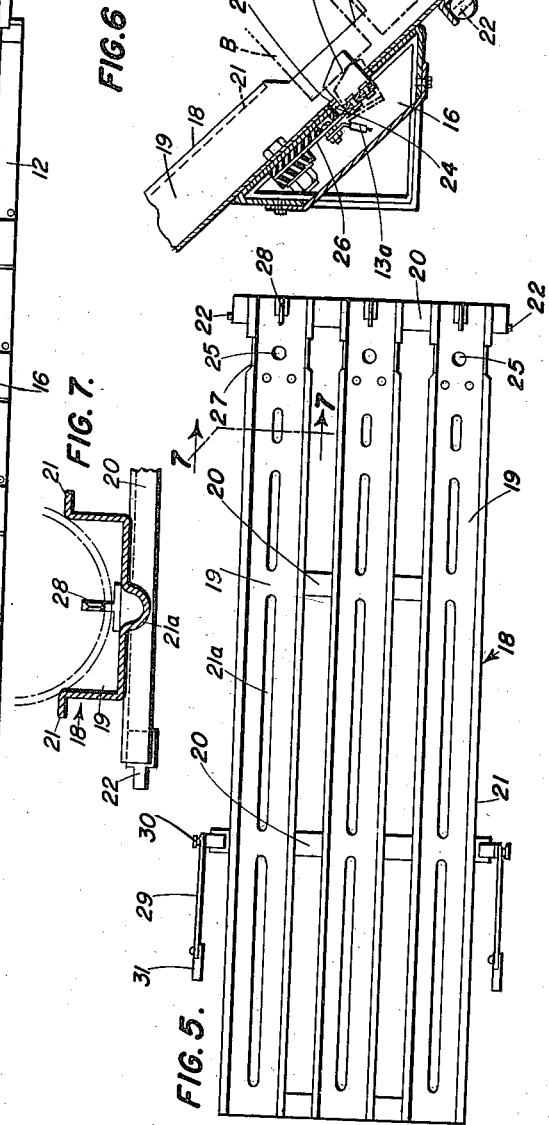
INVENTOR
ALBERT S. GOULD
BY
ATTORNEY Patented Jan. 1, 1952

2,581,096

UNITED STATES PATENT OFFICE 2,581,096

ROCKET LAUNCHER

Albert S. Gould, Pasadena, Calif., assignor to the United States of America as represented by the Secretary of the Navy Application August 13, 1945, Serial No. 610,651

5 Claims. (Cl. 89—1.7)

This invention relates to rocket launchers, and more particularly to demountable launchers for guiding and directing the initial travel of electrically fired rockets.

An object of the invention is to provide a novel demountable rocket launcher which includes a plurality of readily demountable rocket guiding units adapted to be erected on a common base structure, the base structure being arranged to carry all of the electrical wiring necessary to supply firing current to the units.

Another object of the invention is to provide a demountable rocket launcher wherein both the base structure and the rocket guiding units are relatively flat so that when the launcher is disassembled, the parts may be stacked on the base structure so as to occupy a minimum of space, and facilitate transportation and storage.

Another object of the invention is to provide a demountable rocket launcher which is particularly adapted for use on amphibious craft but which may be mounted on a wide range of vehicles such as in the cargo space of conventional trucks.

Another object of the invention is to provide a launcher which may be readily and quickly assembled or disassembled without the use of tools.

A further object of the invention is to provide a rocket launcher of the type referred to above which includes a rocket blast deflector for protecting objects near the rear end of the launcher from the rocket blast.

Another object of the invention is to provide a launcher for use with rockets of the type described in the patent of Charles C. Lauritsen, No. 2,469,350 of May 10, 1949.

These and other objects of the invention will be apparent from the following specification and the accompanying drawings, in which Fig. 1 is a side elevational view of the assembled launcher, parts being broken away, and in section;

Fig. 2 is an end view of the end frame member;

Fig. 3 is a fragmentary detailed view of the pin and slot for locking the end frame to the base;

Fig. 4 is a plan view of the base structure with the rocket guiding units removed, only one of the respective electrical contacts being shown;

Fig. 5 is a plan view of a rocket guiding unit;

Fig. 6 is a detailed cross sectional view showing the relationship of the lower end of a rocket guiding unit with a contact box;

Fig. 7 is an enlarged cross section of one of the guiding units, taken on line 7—7 of Fig. 5, and Fig. 8 is an elevation of one of the keyhole-bracket bosses.

In the embodiment of the invention shown in the drawings, the launcher includes a base structure 11 having side members 12 of channel iron. A cover plate 12a is attached to the outer edges of one of the side members to form a conduit for wiring as will be described presently. Supported between the side members, and occupying about two-thirds the length thereof is a deflector pan 13. The pan is suspended between the base structure side members which are mounted on short pedestals 14 so that the deflector pan clears the surface on which the launcher rests. The rear end of the deflector pan communicates with a deflector scoop 15, the bottom of which curves rearwardly and upwardly from the bottom of the deflector pan.

The side members 12 are connected together by hollow cross members which are constructed of sheet material and which form contact boxes 16. The extremities of each contact box are triangular in form so as to rest on and be secured to the side members, while their intermediate portions are trapezoidal in section to increase the rocket blast escape path. One side of each contact box slopes downwardly and rearwardly at a 45° angle to the base.

A plurality of rocket guiding units 18 is provided, each unit comprising three track members 19 connected by cross braces 20. The track members are formed of sheet metal bent to form channels positioned with their open sides upward and provided with reinforcing flanges 21 and ribs 21a. The track members are of such proportion that the head A and tail rings B and C of a rocket of the type described in the above mentioned patent and outlined in chain lines in Fig. 1 bear on the margins of the track members.

Secured to the inner sides of the side members 12 immediately rearward of each contact box is a pair of bracket bosses 17 having key hole slots therein. The lower cross brace 20 of each rocket guiding unit is provided with laterally extending mounting lugs 22 which are adapted to fit into bracket bosses 17. The mounting lugs are flattened on two sides so that when the units are in a vertical position, the lugs slip into the slots provided in the bracket bosses, the mounting lugs being restrained in the bracket bosses when the rocket guiding units are tilted forward to a 45° angle. The bracket bosses 17 are so positioned that when the rocket guiding units are tilted forwardly to a 45° angle, the lower ends of the track members lie flat against the sloping sides of the contact boxes 16.

Each contact box 16 is provided with a contact 23 having a knife edge which projects through a hole 24 in the contact box and a mating hole 25 near the lower end of the corresponding track member. The contacts 23 are supported by springs 26 suitably mounted on insulating blocks within the contact boxes, as shown in Fig. 6. The necessity for the springs is to enable yielding of each contact when a rocket is inserted and to insure firm pressure against the respective contact ring when the rocket has settled in place. The contacts 23 are adapted to engage the forward tail ring B of the rocket A, shown in Fig. 1, so as to make electrical contact therewith. To avoid shorting of this ring by engagement with the track member, the sides of each track member are notched as indicated by 27 so as to clear ring B when a rocket is positioned on the track. The base end of each track member is provided with a knife edge grounding contact 28 which engages the end ring C of the demolition rocket and also serves to retain the rocket in position in the track on which it is mounted.

Suitable wiring 13a connects the contacts 23 to the firing circuit (not shown), one lead from the firing circuit being connected to the base of the launcher. The wiring from each contact 23 passes through the hollow contact box 16, passes downwardly through holes (not shown) in the top of one of the side members 12 into the conduit formed by the side member and the cover plate 12a, and then passes forwardly out of the channel at 12b for connection to the firing circuit (not shown). The enclosing of the wiring in the boxes 16 and in the conduit formed by side member 12 and cover plate 12a protects the wiring from the rocket blast to prolong its life.

The rocket guiding units are supported in parallel relation with each other by spacer bars 29 which are mounted on journal pins 30 carried by one of the cross braces 20 preferably located about two-thirds the length of the rocket guiding unit from its base end. The extremities of the spacer bars are provided with pivoted latch members 31 which are adapted to interlock with the extremities of the journal pins 30 of adjacent units.

The front rocket guiding unit is supported by an end frame 32 having pins 33 similar to the journal pins 30 which are engaged by the latch members 31 of the front unit. The end frame is provided with mounting lugs 22 (Fig. 3) and the forward end of the base frame has corresponding bracket bosses 17. The direction of the key hole slots is such that the end frame 32 is inserted at an angle and is locked to the base when brought to an upright position as shown in Fig. 3.

To assemble the launcher the end frame is locked in its upright position and rocket guiding units are assembled one at a time, the front one first, by inserting the mounting lugs of the units vertically into the bracket bosses and then tilting the rocket guiding units forwardly and latching each unit to the end frame 32 or the next unit.

Because of the ease with which each rocket guiding unit may be removed, it has been found desirable in practice to place the rockets on each unit as it is positioned. To reload the launcher, the units are disconnected and folded backwardly to provide ready access.

Disassembly of the launcher is equally simple and since the rocket guiding units are relatively flat, they may be stacked and placed flat on the base structure along with the end frame. The disassembled parts occupy little space and are therefore convenient to store and transport.

I claim:
1. A demountable launcher for electrically fired rockets, comprising a base structure including a pair of side members, a rocket blast deflection shield mounted between said side members and terminating in an upturned portion at one end, cross members extending between said side members, electrical contact means carried by said cross members and projecting from one side thereof, a plurality of rocket guiding units separably mounted on said base structure adjacent the contact carrying sides of said cross members, spacer members separably connecting the extended ends of said units to dispose the units in parallel relation, and an electrical contact member carried by each of said units, whereby said contact means and said contact member are adapted to engage rockets supported by said rocket guiding units.

2. A rocket launcher comprising a base frame including a pair of side members, a rocket blast deflection shield mounted between said side members and terminating in an upturned portion at one end, cross members extending between said side members, one side of each of said cross members being disposed at a predetermined angle with respect to said base and resiliently supporting an electrical firing contact extending through said side, a plurality of rocket guiding units, pin and slot connecting means joining each of said units by its base end to said base structure adjacent said cross members, said connecting means being separable when a unit is in a vertical position and interlocking when said unit is inclined forwardly, means for rigidly supporting an end unit of said plurality of guiding units at said predetermined angle with respect to the base, spacer means carried by said units for maintaining the remainder of said units in parallel spaced relation with said end unit, and an electrical firing contact carried by each of said units, whereby said firing contacts engage rockets supported on said units.

3. A demountable rocket launcher, comprising a base structure including side members, at least one hollow cross member fixedly extending between said side members, electrical contacts projecting from said cross member and having electrical wiring for said contacts carried within its hollow inside, and at least one rocket guiding unit separably hinged between said side members to swing into a position against the cross member whereat the contact of said cross member enters the guiding unit to engage a rocket when supported on said unit.

4. A demountable rocket launcher, comprising a base structure including side members, hollow cross members extending between said side members, electrical contacts projecting from said cross members, electrical wiring for said contacts carried within said cross members and along said side members, a plurality of rocket guiding units, each unit including a plurality of launcher tracks adapted to receive electrically fired rockets, readily separable means for mounting said units between said side members in a position wherein the contacts of said cross members engage rockets supported on said launcher tracks, and a rocket blast deflector mounted below said side members and having an upturned rear extremity extending beyond said launcher units.

5. In a rocket launcher, a base structure including longitudinal channel members at least one pair of and hollow cross members spaced in the longitudinal direction of the channel members, at least two rocket guiding units attached to the channel members, each leaning forwardly against an adjacent cross member thus deriving the spacing of said members to make room for a rocket in firing position on the foremost guiding unit, and electrical contact carried by each cross member one of them potentially active for firing the rocket on the foremost guiding unit, electrical conductors for supplying electrical firing current to said contacts, and a cover plate on one of said channel members to form a conduit for said conductors within said channel member, said conductors lying within said cross member and said conduit, whereby said conductors are adapted to be protected from the blast of the rocket when fired from the foremost guiding unit.

ALBERT S. GOULD.

REFERENCES CITED

The following references are of record in the file of this patent:

UNITED STATES PATENTS

| Number | Name | Date |
|---|---|---|
| 499,790 | Meadowcroft | June 20, 189_ |
| 2,398,871 | Turnbull et al. | Apr. 23, 194_ |

FOREIGN PATENTS

| Number | Country | Date |
|---|---|---|
| 25,326 | Great Britain | 189_ |
| 468,583 | Great Britain | July 8, 193_ |
| 611,076 | France | Sept. 20, 192_ |

OTHER REFERENCES

"Army Ordnance," page 91, "New Rocket Powe_ etc.," July-Aug. 1945.

"Coast Artillery," page 13, "Rocket Target_ etc.," Mar.-Apr. 1944.

"Army Ordnance," page 263, "Bazooka Rocke_ Launcher," Sept.-Oct. 1944.